(12) United States Patent
Sakata

(10) Patent No.: US 10,284,747 B2
(45) Date of Patent: May 7, 2019

(54) IMAGE FORMING APPARATUS CONFIGURED TO ADJUST PRINT POSITIONS AND METHOD FOR CONTROLLING IMAGE FORMING APPARATUS CONFIGURED TO ADJUST PRINT POSITIONS

(71) Applicant: CANON KABUSHIKI KAISHA, Tokyo (JP)

(72) Inventor: Munetaka Sakata, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/883,645

(22) Filed: Jan. 30, 2018

(65) Prior Publication Data
US 2018/0220038 A1    Aug. 2, 2018

(30) Foreign Application Priority Data

Feb. 1, 2017    (JP) .................. 2017-017099

(51) Int. Cl.
| | |
|---|---|
| *G03G 15/00* | (2006.01) |
| *H04N 1/387* | (2006.01) |
| *H04N 1/60* | (2006.01) |
| *H04N 1/00* | (2006.01) |
| *H04N 1/50* | (2006.01) |

(52) U.S. Cl.
CPC ....... *H04N 1/3873* (2013.01); *G03G 15/5041* (2013.01); *G03G 15/5062* (2013.01); *G03G 15/556* (2013.01); *H04N 1/00* (2013.01); *H04N 1/506* (2013.01); *H04N 1/6033* (2013.01); *H04N 1/6097* (2013.01); *H04N 2201/0082* (2013.01)

(58) Field of Classification Search
CPC .................................................. G03G 15/5041
USPC ...................................................... 399/49, 72
See application file for complete search history.

(56) References Cited

U.S. PATENT DOCUMENTS

| | | | |
|---|---|---|---|
| 7,796,902 B2* | 9/2010 | Watanabe et al. | ........................... G03G 15/5037 399/49 |
| 10,007,220 B2* | 6/2018 | Zaima | ................ G03G 15/5041 |
| 2016/0044184 A1 | 2/2016 | Miyazaki | |

FOREIGN PATENT DOCUMENTS

JP     2005010733 A    1/2005

* cited by examiner

*Primary Examiner* — William J Royer
(74) *Attorney, Agent, or Firm* — Canon U.S.A., Inc. IP Division

(57) ABSTRACT

An image forming apparatus includes an image forming unit configured to form an image by using a developer, and a controller configured to control the image forming unit to form a test image on the sheet, acquire information related to the test image, and correct, based on the information, a position on the sheet, wherein the test image is used to detect positional deviation, wherein the controller performs first processing in which the image forming unit forms the test image and a first pattern image, and second processing in which the image forming unit forms the test image and a second pattern image, wherein the image forming unit forms the first pattern image so that an adhesion amount of the developer becomes a first amount, and the second pattern image so that an adhesion amount of the developer becomes a second amount that is larger than the first amount.

20 Claims, 16 Drawing Sheets

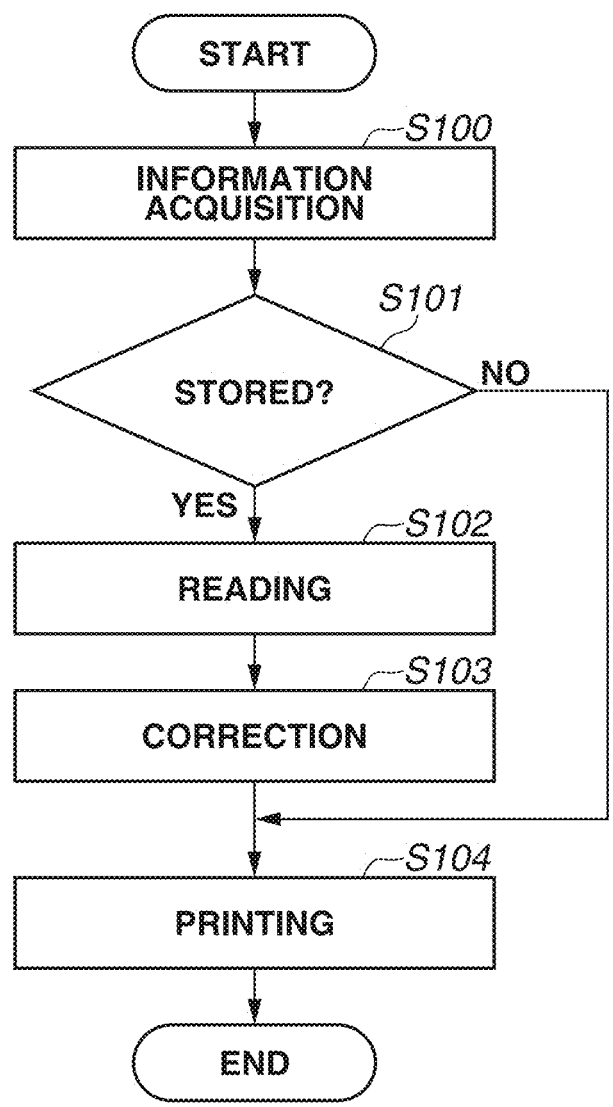

FIG.4

PAPER LIBRARY — 411

| NAME | WIDTH (mm) | LENGTH (mm) | GRAMMAGE (g/m²) | SURFACE | COLOR |
|---|---|---|---|---|---|
| RECYCLED PAPER 1 FROM ABC PAPER MANUFACTURE | 210 | 297 | 75 | PLAIN PAPER | WHITE |
| RECYCLED PAPER 2 FROM ABC PAPER MANUFACTURE | 297 | 420 | 75 | PLAIN PAPER | WHITE |
| EMBOSSED PAPER A-1 FROM DEF PAPER MANUFACTURE | 216 | 279 | 150 | EMBOSSED PAPER | WHITE |
| COATED PAPER P-1 FROM DEF PAPER MANUFACTURE | 279 | 452 | 128 | BOTH-SURFACE COATED PAPER | WHITE |
| COLOR PAPER 81 FROM XYZ PAPER MANUFACTURE | 210 | 297 | 75 | PLAIN PAPER | ORANGE |
| COLOR PAPER 82 FROM XYZ PAPER MANUFACTURE | 210 | 297 | 75 | PLAIN PAPER | PINK |

[ NEW ]  [ EDIT ]  [ DELETE ]  [ SELECT ]

FIG.5

PAPER ATTRIBUTES

| | | |
|---:|:---|:---|
| NAME | COLOR PAPER 81 FROM XYZ PAPER MANUFACTURE | ~501 |
| WIDTH (mm) | 210 | ~502 |
| LENGTH (mm) | 297 | ~503 |
| GRAMMAGE (g/m²) | 75 | ~504 |
| SURFACE | PLAIN PAPER ▼ | ~505 |
| COLOR | WHITE ▼ | ~506 |
| PREPRINT PAPER | ☐ | ~507 |

[ END EDITING ] ~520    [ CANCEL ] ~521

FIG.6

| | NAME | WIDTH (mm) | LENGTH (mm) | GRAMMAGE (g/m²) | SURFACE | COLOR | PREPRINT PAPER | DEVIATION AMOUNT (FRONT SURFACE) | DEVIATION AMOUNT (BACK SURFACE) |
|---|---|---|---|---|---|---|---|---|---|
| | 611 | 612 | 613 | 614 | 615 | 616 | 617 | 618 | 619 |
| 601 | RECYCLED PAPER 1 FROM ABC PAPER MANUFACTURE | 210 | 297 | 75 | PLAIN PAPER | WHITE | No | RECTANGULAR CORRECTION AMOUNT: 0.23 mm<br>TRAPEZOIDAL CORRECTION AMOUNT: 0.71 mm<br>LEAD POSITION: 0.3 mm<br>SIDE POSITION: -0.1 mm<br>MAIN SCANNING MAGNIFICATION: +0.02%<br>SUB SCANNING MAGNIFICATION: +0.01% | RECTANGULAR CORRECTION AMOUNT: 0.27 mm<br>TRAPEZOIDAL CORRECTION AMOUNT: 0.55 mm<br>LEAD POSITION: 0.2 mm<br>SIDE POSITION: 0.1 mm<br>MAIN SCANNING MAGNIFICATION: +0.02%<br>SUB SCANNING MAGNIFICATION: +0.02% |
| 602 | RECYCLED PAPER 2 FROM ABC PAPER MANUFACTURE | 297 | 420 | 75 | PLAIN PAPER | WHITE | No | RECTANGULAR CORRECTION AMOUNT: 0.00 mm<br>TRAPEZOIDAL CORRECTION AMOUNT: 0.00 mm<br>LEAD POSITION: 0.0 mm<br>SIDE POSITION: 0.0 mm<br>MAIN SCANNING MAGNIFICATION: +0.00%<br>SUB SCANNING MAGNIFICATION: +0.00% | RECTANGULAR CORRECTION AMOUNT: 0.00 mm<br>TRAPEZOIDAL CORRECTION AMOUNT: 0.00 mm<br>LEAD POSITION: 0.0 mm<br>SIDE POSITION: 0.0 mm<br>MAIN SCANNING MAGNIFICATION: +0.00%<br>SUB SCANNING MAGNIFICATION: +0.00% |
| 603 | EMBOSSED PAPER A-1 FROM DEF PAPER MANUFACTURE | 216 | 279 | 170 | EMBOSSED PAPER | WHITE | No | RECTANGULAR CORRECTION AMOUNT: 0.48 mm<br>TRAPEZOIDAL CORRECTION AMOUNT: 0.41 mm<br>LEAD POSITION: 0.5 mm<br>SIDE POSITION: -0.5 mm<br>MAIN SCANNING MAGNIFICATION: +0.02%<br>SUB SCANNING MAGNIFICATION: +0.02% | RECTANGULAR CORRECTION AMOUNT: 0.08 mm<br>TRAPEZOIDAL CORRECTION AMOUNT: 0.29 mm<br>LEAD POSITION: -0.3 mm<br>SIDE POSITION: 0.5 mm<br>MAIN SCANNING MAGNIFICATION: -0.01%<br>SUB SCANNING MAGNIFICATION: -0.03% |
| 604 | COATED PAPER P-1 FROM DEF PAPER MANUFACTURE | 279 | 432 | 128 | BOTH-SURFACE COATED PAPER | WHITE | No | RECTANGULAR CORRECTION AMOUNT: 0.11 mm<br>TRAPEZOIDAL CORRECTION AMOUNT: -0.21 mm<br>LEAD POSITION: 0.4 mm<br>SIDE POSITION: -0.2 mm<br>MAIN SCANNING MAGNIFICATION: +0.12%<br>SUB SCANNING MAGNIFICATION: +0.08% | RECTANGULAR CORRECTION AMOUNT: 0.41 mm<br>TRAPEZOIDAL CORRECTION AMOUNT: -0.31 mm<br>LEAD POSITION: -0.2 mm<br>SIDE POSITION: 0.6 mm<br>MAIN SCANNING MAGNIFICATION: -0.02%<br>SUB SCANNING MAGNIFICATION: -0.01% |
| 605 | COLOR PAPER 81 FROM XYZ PAPER MANUFACTURE | 210 | 297 | 75 | PLAIN PAPER | ORANGE | No | RECTANGULAR CORRECTION AMOUNT: 0.00 mm<br>TRAPEZOIDAL CORRECTION AMOUNT: 0.00 mm<br>LEAD POSITION: 0.0 mm<br>SIDE POSITION: 0.0 mm<br>MAIN SCANNING MAGNIFICATION: +0.00%<br>SUB SCANNING MAGNIFICATION: +0.00% | RECTANGULAR CORRECTION AMOUNT: 0.00 mm<br>TRAPEZOIDAL CORRECTION AMOUNT: 0.00 mm<br>LEAD POSITION: 0.0 mm<br>SIDE POSITION: 0.0 mm<br>MAIN SCANNING MAGNIFICATION: +0.00%<br>SUB SCANNING MAGNIFICATION: +0.00% |

PAPER LIBRARY

FIG.7
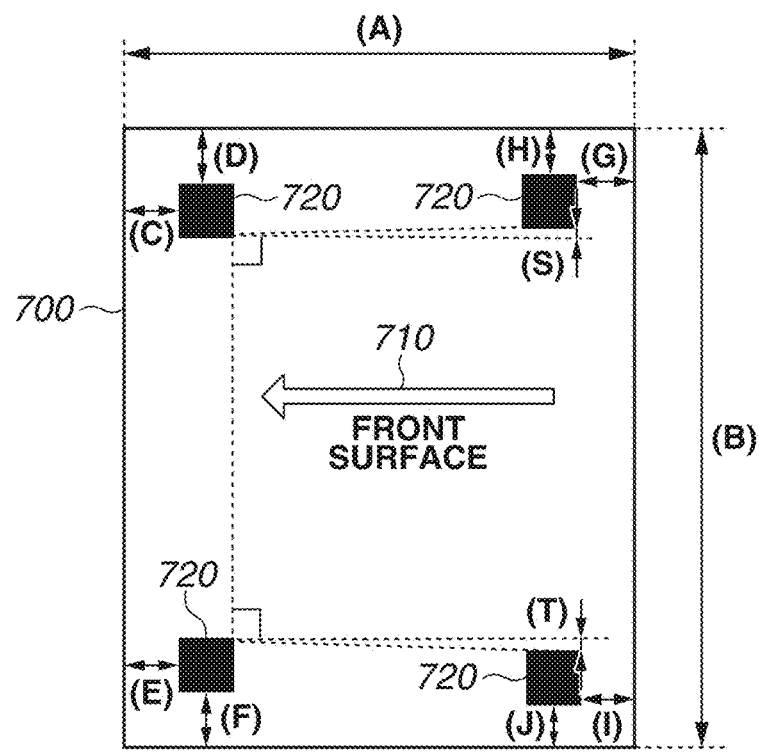
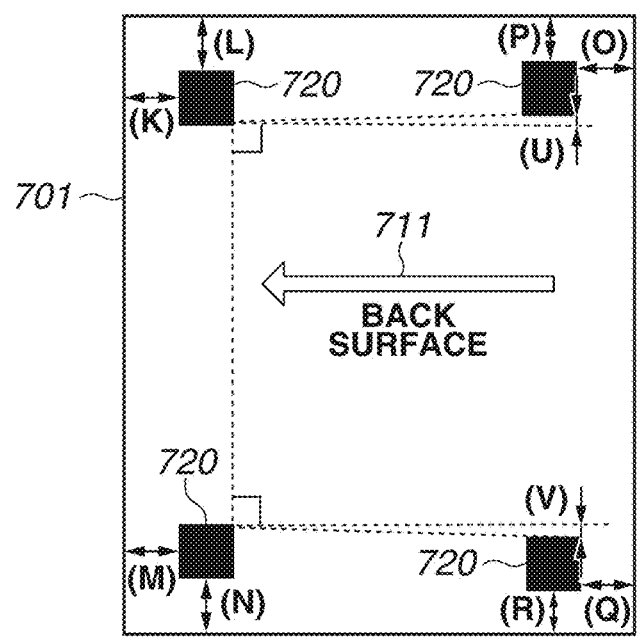

FIG.8

| | MEASURED VALUE (820) | IDEAL VALUE (821) | PRINT POSITION DEVIATION AMOUNT (822) |
|---|---|---|---|
| LEAD POSITION (FRONT SURFACE) (801) | $\frac{(C)+(E)}{2}$ | 1 cm | MEASURED VALUE - IDEAL VALUE |
| SIDE POSITION (FRONT SURFACE) (802) | $\frac{(F)+(J)}{2}$ | 1 cm | MEASURED VALUE - IDEAL VALUE |
| LONGITUDINAL MAGNIFICATION (FRONT SURFACE) (803) | $\frac{((B)-(D)-(F))+((B)-(H)-(J))}{2}$ | LONGITUDINAL PAPER LENGTH - 2cm | (MEASURED VALUE - IDEAL VALUE) / IDEAL VALUE |
| WIDTHWISE MAGNIFICATION (FRONT SURFACE) (804) | $\frac{((A)-(C)-(G))+((A)-(E)-(I))}{2}$ | WIDTHWISE PAPER LENGTH - 2cm | (MEASURED VALUE - IDEAL VALUE) / IDEAL VALUE |
| RECTANGULAR CORRECTION AMOUNT (FRONT SURFACE) (805) | $\frac{(S)+(T)}{2}$ | 0 cm | MEASURED VALUE |
| TRAPEZOIDAL CORRECTION AMOUNT (FRONT SURFACE) (806) | $\frac{((B)-(D)-(F))-((B)-(H)-(J))}{2}$ | 0 cm | MEASURED VALUE |
| LEAD POSITION (BACK SURFACE) (807) | $\frac{(K)+(M)}{2}$ | 1 cm | MEASURED VALUE - IDEAL VALUE |
| SIDE POSITION (BACK SURFACE) (808) | $\frac{(N)+(R)}{2}$ | 1 cm | MEASURED VALUE - IDEAL VALUE |
| LONGITUDINAL MAGNIFICATION (BACK SURFACE) (809) | $\frac{((B)-(L)-(N))+((B)-(P)-(R))}{2}$ | LONGITUDINAL PAPER LENGTH - 2cm | (MEASURED VALUE - IDEAL VALUE) / IDEAL VALUE |
| WIDTHWISE MAGNIFICATION (BACK SURFACE) (810) | $\frac{((A)-(K)-(O))+((A)-(M)-(Q))}{2}$ | WIDTHWISE PAPER LENGTH - 2cm | (MEASURED VALUE - IDEAL VALUE) / IDEAL VALUE |
| RECTANGULAR CORRECTION AMOUNT (BACK SURFACE) (811) | $\frac{(U)+(V)}{2}$ | 0 cm | MEASURED VALUE |
| TRAPEZOIDAL CORRECTION AMOUNT (BACK SURFACE) (812) | $\frac{((B)-(L)-(N))-((B)-(P)-(R))}{2}$ | 0 cm | MEASURED VALUE |

FIG.13A

1300 — JOB PRINT APPLICATION

| JOB NAME | NUMBER OF PAGES | NUMBER OF COPIES | ONE-SIDED/ DOUBLE-SIDED |
|---|---|---|---|
| PRINT JOB 1 | 50 | 100 | DOUBLE-SIDED |
| PRINT JOB 2 | 20 | 50 | ONE-SIDED |

1310

- JOB ACTION — 1320
- PRINT — 1321
- RIP — 1322
- ADJUST PRINT POSITION — 1323
- JOB PROPERTIES — 1324

FIG.13B

1330 — PRINT POSITION ADJUSTMENT

- 1331 PRINTED IMAGE
- 1332 CHART
- 1333 (scrollbar)
- 1340 EXECUTE
- 1341 SELECT CHART
- 1342 CANCEL

FIG.13C

1350 — CHART SELECTION

- 1351 CHART
- 1360 APPLY
- 1361 CANCEL

FIG.14

| | 300.0 mm OR MORE | 250.0 mm OR MORE AND LESS THAN 300.0 mm | 200.0 mm OR MORE AND LESS THAN 250.0 mm | LESS THAN 200.0 mm |
|---|---|---|---|---|
| DENSITY 1 | TONER: HIGH | TONER: MIDDLE | TONER: MIDDLE | TONER: LOW |
| DENSITY 2 | TONER: MIDDLE | TONER: MIDDLE | TONER: LOW | TONER: LOW |

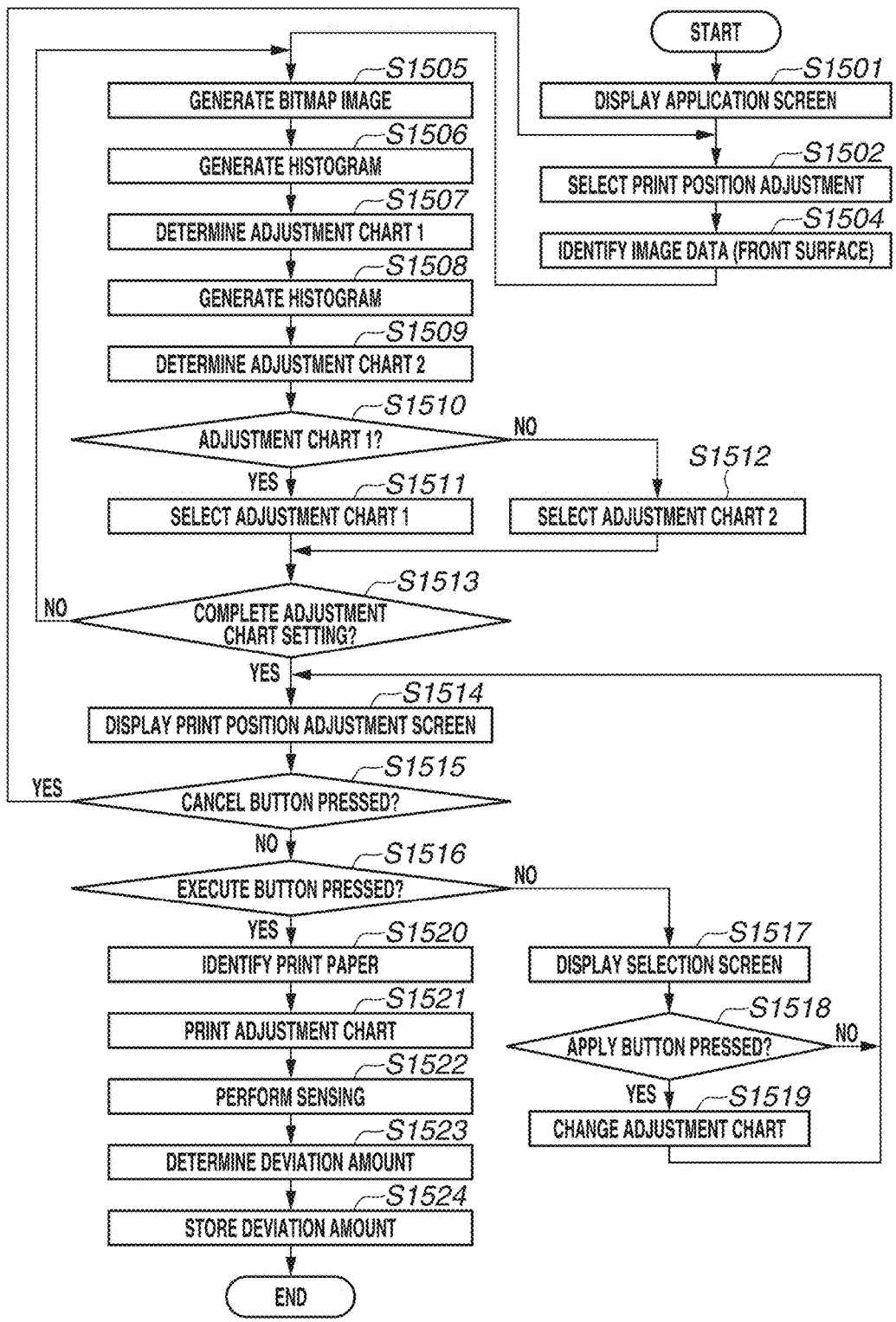

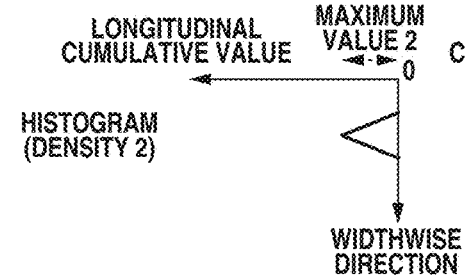
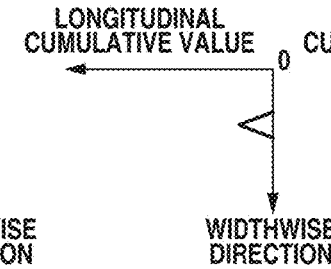
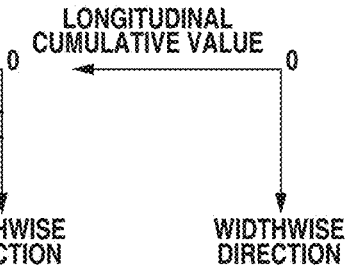

IMAGE FORMING APPARATUS CONFIGURED TO ADJUST PRINT POSITIONS AND METHOD FOR CONTROLLING IMAGE FORMING APPARATUS CONFIGURED TO ADJUST PRINT POSITIONS

BACKGROUND OF THE INVENTION

Field of the Invention

The present invention relates to a print position adjustment for adjusting image forming positions with respect to a print sheet.

Description of the Related Art

A common image forming apparatus has a print position adjustment function for adjusting print positions (also referred to as image forming positions) of an image with respect to a print sheet so that the image is to be printed at an intended position on the print sheet. For example, in double-sided printing, adjusting print positions enables aligning print positions of an image on the front surface of the print sheet and print positions of an image on the back surface of the print sheet. For example, when printing an image on preprint paper with ruled lines preprinted thereon, an image can be printed not to overlap with the ruled lines by adjusting print positions.

Print position adjustment needs to be performed for each paper type to be used for image printing. This is because the expansion/contraction amount of paper differs according to the size, grammage, and material of paper.

For example, an image forming apparatus discussed in United States Patent Publication Application No. 2016/0044184 prints a test sheet, allows a sensing device to read the test sheet, and detects print position deviations based on the result of reading the test sheet. For example, the image forming apparatus detects print position deviations based on the distances from reference positions of the test sheet to marks thereon and determines the correction amounts for correcting print positions based on the result of the detection. When performing print processing by using paper of the same type as target paper, the image forming apparatus corrects print positions based on the correction amounts.

According to an experiment performed by the inventors, it turned out that, the deviation amounts of print positions vary according to the density of an image printed on paper. More specifically, when an image with a 100% density was formed on paper of the A3 size, a 1.0-mm deviation occurred between an image print position on the front surface and the image print position on the back surface in the conveyance direction. When an image with a 25% density was formed on paper of the A3 size, a 0.5-mm deviation occurred between an image print position on the front surface and the image print position on the back surface in the conveyance direction.

When an image with a 20-cm length and a 100% density was formed on paper of the A3 size, the difference between an image print position on the front surface and the image print position on the back surface was 0.2 mm or less in the conveyance direction. This means that, to adjust print positions with a high accuracy, it is necessary to detect print position deviation amounts according to the amount of toner adhered to the image based on image data.

SUMMARY OF THE INVENTION

According to embodiments of the present invention, an image forming apparatus includes an image forming unit configured to form an image on a sheet by using a developer, and a controller configured to control the image forming unit to form a test image on the sheet, configured to acquire information related to the test image formed on the sheet by the image forming unit, and configured to correct, based on the information, a position of an image to be formed on the sheet by the image forming unit, wherein the test image is used to detect positional deviation of the image to be formed on the sheet by the image forming unit, wherein the controller performs first processing in which the image forming unit forms the test image and a first pattern image on the sheet, and second processing in which the image forming unit forms the test image and a second pattern image on the sheet, wherein the image forming unit forms the first pattern image so that an adhesion amount of the developer becomes a first amount, and wherein the image forming unit forms the second pattern image so that an adhesion amount of the developer becomes a second amount that is larger than the first amount.

According to embodiments of the present invention, a method for controlling an image forming apparatus for forming an image on a sheet by using a developer includes forming a test image on the sheet, acquiring information related to the test image formed on the sheet, and correcting, based on the information, a position of an image to be formed on the sheet, wherein the test image is used to detect positional deviation of the image to be formed on the sheet, wherein, in a case where the test image and a first pattern image are formed on the sheet in the test image forming, the first pattern image is formed so that an adhesion amount of the developer becomes a first amount, and wherein, in a case where the test image and a second pattern image are formed on the sheet in the test image forming, the second pattern image is formed so that an adhesion amount of the developer becomes a second amount that is larger than the first amount.

Further features of the present invention will become apparent from the following description of exemplary embodiments with reference to the attached drawings.

BRIEF DESCRIPTION OF THE DRAWINGS

FIG. 3 is a flowchart illustrating print processing in which the image forming apparatus forms an image based on print data.

FIG. 4 illustrates a paper library editing screen.

FIG. 5 illustrates a paper information editing screen.

FIG. 6 schematically illustrates a paper library.

FIG. 7 schematically illustrates adjustment charts.

FIG. 8 is a list illustrating methods for calculating print position deviation amounts.

FIGS. 13A, 13B, and 13C illustrate application screens.

FIG. 14 is a table illustrating combinations of the adhesion amount of toner and adjustment charts.

FIG. 15 is a flowchart illustrating a modification of print position adjustment.

DESCRIPTION OF THE EMBODIMENTS (Configuration of Printing System)

Figure 1:
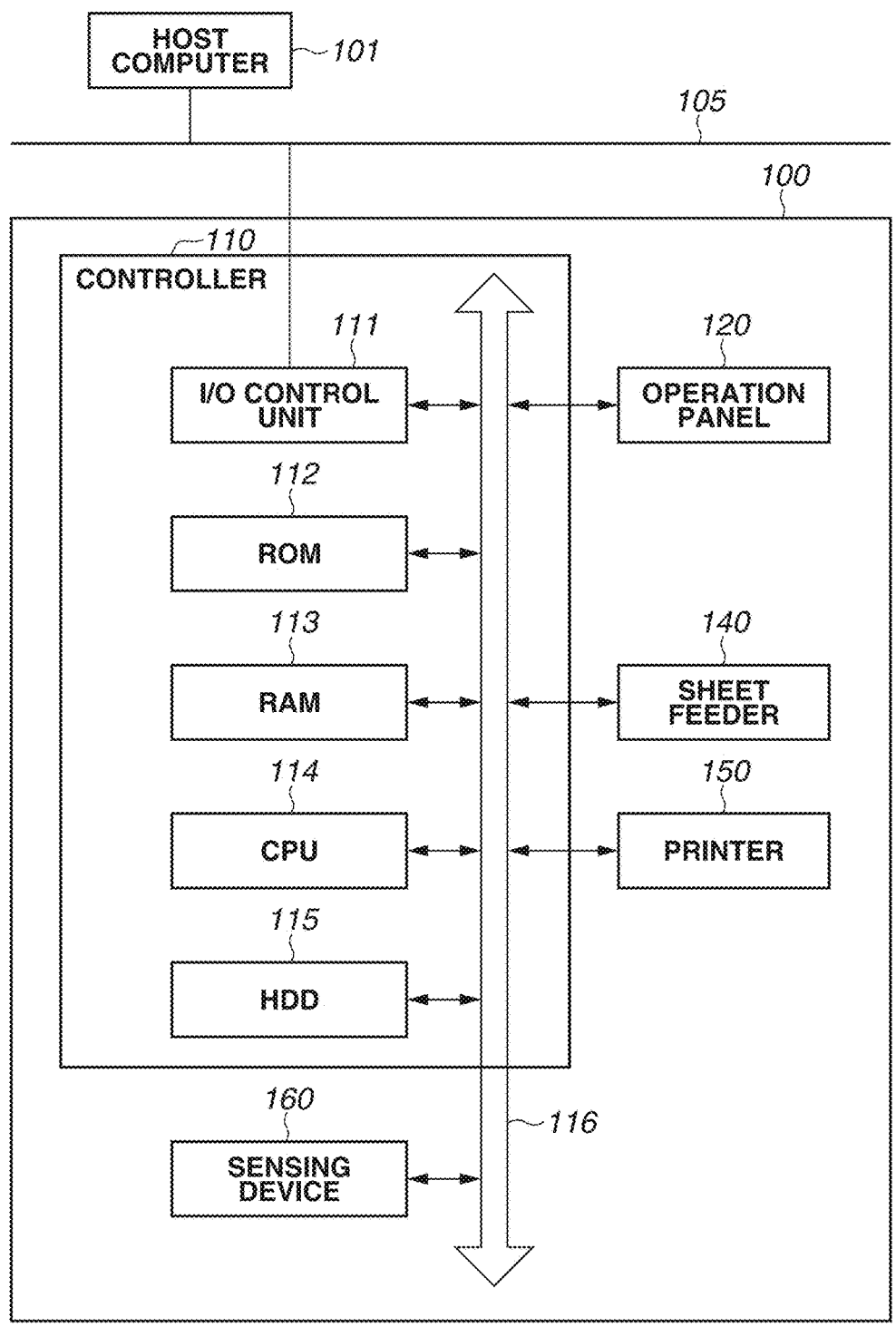
FIG. 1 is a control block diagram illustrating a printing system.

FIG. 1 illustrates an overall configuration of a printing system including an image forming apparatus 100. The printing system includes the image forming apparatus 100 and a host computer 101. The image forming apparatus 100 and the host computer 101 are connected via a network 105 so that they can communicate with each other. The network 105 is a communication line such as a local area network (LAN) and a wide area network (WAN). A plurality of the image forming apparatuses 100 and a plurality of the host computers 101 may be connected to the network 105.

The host computer 101 is, for example, a server for transmitting a print job to the image forming apparatus 100 via the network 105. A print job includes various information required for printing, such as image data, a type of paper to be used for printing, the number of print sheets, and a double-sided/one-sided printing instruction.

The image forming apparatus 100 includes a controller 110, an operation panel 120, a sheet feeder 140, a printer 150, and a sensing device 160. The image forming apparatus 100 forms an image on paper based on a print job acquired from the host computer 101. The controller 110, the operation panel 120, the sheet feeder 140, the printer 150, and the sensing device 160 are mutually connected via a system bus 116 so that they can communicate with each other.

The controller 110 controls each unit of the image forming apparatus 100. The operation panel 120 as a user interface is provided with operation buttons, a numeric keypad, and a liquid crystal display (LCD). An operator can input a print job, command, print setting, etc. in the image forming apparatus 100 from the operation panel 120. The operation panel 120 displays setting screens and statuses of the image forming apparatus 100 on the LCD.

The sheet feeder 140 includes a plurality of sheet decks for storing paper. The sheet feeder 140 feeds sheets of paper one by one from the top of sheets stacked in a sheet deck. The sheet feeder 140 conveys a sheet fed from the sheet deck to the printer 150.

The printer 150 forms an image on the sheet supplied from the sheet feeder 140 based on image data. A specific configuration of the printer 150 will be described below with reference to FIG. 2. The sensing device 160 reads a printed document generated by the printer 150 and transmits a reading result to the controller 110. A specific configuration of the sensing device 160 will be described below with reference to FIG. 2.

A configuration of the controller 110 will be described below. The controller 110 includes a read only memory (ROM) 112, a random access memory (RAM) 113, and a central processing unit (CPU) 114. The controller 110 further includes an input/output (I/O) control unit 111 and a hard disk drive (HDD) 115.

The I/O control unit 111 is an interface for controlling communication with the host computer 101 and other apparatuses via the network 105. The ROM 112 is a storage device for storing various control programs. The RAM 113 functions as a system work memory for loading a control program stored in the ROM 112. The CPU 114 executes a control program loaded in the RAM 113 to totally control the image forming apparatus 100. The HDD 115 is a mass storage device. The HDD 115 stores control programs and image data to be used for the image forming processing (print processing) and other various data. These modules are connected with each other via the system bus 116.

Figure 2:
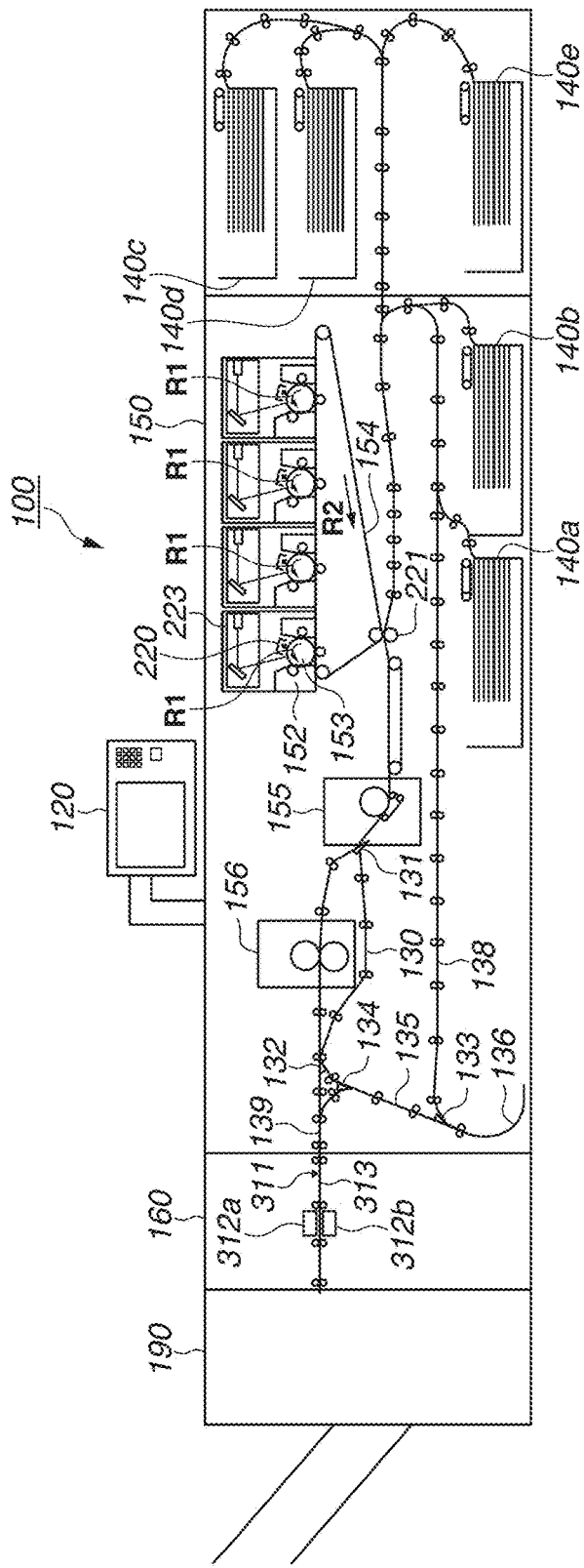
FIG. 2 is a cross-sectional view schematically illustrating an image forming apparatus.

FIG. 2 is a cross-sectional view schematically illustrating the image forming apparatus 100. The image forming apparatus 100 includes the sheet feeder 140, the printer 150, the sensing device 160, and a finisher 190. The finisher 190 is a post-processing apparatus for performing post-processing on a printed document from the printer 150. For example, the finisher 190 performs staple processing on a plurality of printed sheets and performs sort processing on the printed sheets.

As illustrated in FIG. 2, the printer 150 includes four image forming units. A plurality of the image forming units includes an image forming unit for forming a yellow image, an image forming unit for forming a magenta image, an image forming unit for forming a cyan image, and an image forming unit for forming a black image. The configuration of each image forming unit is almost similar.

Each image forming unit includes a photosensitive drum 153, a charging device 220, an exposure device 223, and a developing device 152. The photosensitive drum 153 rotates in the direction indicated by the arrow R1 by a motor (not illustrated). The charging device 220 charges the surface of the photosensitive drum 153. The photosensitive drum 153 is exposed to light by the exposure device 223. Then, an electrostatic latent image is formed on the photosensitive drum 153. The developing device 152 develops the electrostatic latent image by using a developer (toner). Then, the electrostatic latent image on the photosensitive drum 153 is visualized, and an image is formed on the photosensitive drum 153.

The printer 150 includes an intermediate transfer belt 154 on which images formed by the image forming units are to be transferred, and the sheet feeder 140. The sheet feeder 140 includes sheet decks 140a, 140b, 140c, 140d, and 140e for storing paper. In the printer 150, the yellow, magenta, cyan, and black images formed by the image forming units are transferred to the intermediate transfer belt 154 in a superimposed way. Then, a full color image is formed on the intermediate transfer belt 154. The image on the intermediate transfer belt 154 is conveyed in the direction of the arrow R2. The image formed on the intermediate transfer belt 154 is transferred to a NIP portion between the intermediate transfer belt 154 and a transfer roller 221 on the paper conveyed from the sheet feeder 140.

The printer 150 includes a first fixing device 155 and a second fixing device 156 for fixing an image transferred onto paper by heating and pressurizing the image. The first fixing device 155 includes a fixing roller incorporating a heater, and a pressure belt for making paper in pressure contact with the fixing roller. This roller is driven by a motor (not illustrated) to convey the paper. The second fixing device 156 is disposed on the downstream side of the first fixing device 155 in the paper conveyance direction. The second fixing device 156 increases the glossiness and ensures the fixability of the image on paper having passed through the first fixing device 155. The second fixing device 156 includes a fixing roller incorporating a heater, and a pressure roller incorporating a heater. The second fixing device 156 does not need to be used depending on the paper type. In this case, paper is conveyed to a conveyance path 130 without passing through the second fixing device 156. A flapper 131 switches the destination of paper guidance between the conveyance path 130 and the second fixing device 156.

A flapper 132 switches the destination of paper guidance between a conveyance path 135 and a discharge path 139.

The flapper 132 guides paper with an image formed on the first surface of a print sheet to the conveyance path 135, for example, in the double-sided print mode. The flapper 132 guides paper with an image formed on the first surface to the discharge path 139, for example, in the face-up discharge mode. The flapper 132 guides paper with an image formed on the first surface to the conveyance path 135, for example, in the face-down discharge mode. After an adjustment chart is printed on the first surface of the print sheet, the flapper 132 guides the paper to the conveyance path 135 to print an adjustment chart on the second surface of the print sheet.

The paper conveyed to the conveyance path 135 is further conveyed to a reversing unit 136. The paper conveyance operation for the paper conveyed to the reversing unit 136 is once stopped. Then, the paper conveyance direction is reversed on a switchback basis. Then, a flapper 133 switches the destination of paper guidance between a conveyance path 138 and the conveyance path 135. In the double-sided print mode, for example, the flapper 133 guides to the conveyance path 138 the paper of which the conveyance direction was reversed on a switchback basis. In the face-down discharge mode, for example, the flapper 133 guides to the conveyance path 135 the paper of which the conveyance direction was reversed on a switchback basis. The paper conveyed to the conveyance path 135 by the flapper 133 is then guided to the discharge path 139 by a flapper 134. To print an adjustment chart on the second surface of the print sheet, the flapper 133 guides to the conveyance path 138 the paper of which the conveyance direction is reversed on a switchback basis.

The paper conveyed to the conveyance path 138 by the flapper 133 is then conveyed toward the NIP portion between the intermediate transfer belt 154 and the transfer roller 221. In this case, the front and the back surfaces of paper when passing through the NIP portion is reversed.

The sensing device 160 for reading the adjustment chart on the paper is connected on the downstream side of the printer 150 in the paper conveyance direction. The paper supplied from the printer 150 to the sensing device 160 is conveyed along a conveyance path 313. The sensing device 160 includes a sheet detection sensor 311 and line sensors 312a and 312b. While conveying the paper with an adjustment chart printed thereon by the printer 150 along the conveyance path 313, the sensing device 160 reads the paper via the line sensors 312a and 312b. The adjustment chart will be described in detail below with reference to FIG. 7. In the following descriptions, the paper with an adjustment chart printed thereon is referred to as a test sheet. Images other than an adjustment chart are also conveyed to the finisher 190 along the conveyance path 313.

The sheet detection sensor 311 is, for example, an optical sensor having a light emitting element and a light receiving element. The sheet detection sensor 311 detects the leading edge of the test sheet conveyed along the conveyance path 313 in the conveyance direction. The controller 110 calculates the skew amount of paper based on the timing when the sheet detection sensor 311 detects the leading edge of paper.

The line sensors 312a and 312b read the adjustment chart on the test sheet. The adjustment chart is printed, for example, on both the front and the back surfaces of paper. The line sensors 312a and 312b are disposed at such positions that sandwich the conveyance path 313 to read both surfaces of the test sheet at one time. When print position adjustment is performed, the image forming apparatus 100 detects deviation amounts of print positions (image forming positions) of the adjustment chart based on the result of reading the test sheet by the line sensors 312a and 312b. Then, the controller 110 controls the image forming processing based on the deviation amounts of print positions (image forming positions) so that the print positions (image forming positions) with respect to the print sheet become ideal positions.

(Paper Library)

Paper usable by the image forming apparatus 100 is managed by a database which is referred to as a paper library. The paper library is stored, for example, in the host computer 101 (server) connected with the image forming apparatus 100 via a network. Alternatively, the paper library is stored, for example, in the HDD 115. Data is read from and written in the paper library as required.

FIG. 4 illustrates an interface screen for allowing the operator to edit data stored in the paper library. This interface screen is displayed on the operation panel 120 of the image forming apparatus 100. An interface screen 400 includes a paper list 410, a "NEW" button 420, an "EDIT" button 421, a "DELETE" button 422, and a "SELECT" button 423.

The paper list 410 displays a list of paper managed by the paper library. Columns 411 to 417 indicate attribute information of paper. The column 411 indicates the name of paper. The name of paper is information set by the operator so that the operator can identify the type of paper. The columns 412 and 413 indicate the size of paper. The column 412 indicates the width, and the column 413 indicates the length. The column 414 indicates the grammage of paper.

The column 415 indicates information for allowing the operator to identify the surface nature of paper. The information for allowing the operator to identify the surface nature of paper refers to information related to the physical characteristics of the paper surface. For example, the paper of which the column 415 displays "Coated" refers to paper applied with surface treatment for improving glossiness. For example, the paper of which the column 415 displays "Embossed" refers to paper applied with unevenness processing. For example, the paper of which the column 415 displays "Plain Paper" refers to paper applied with special processing. The column 416 indicates the color of paper.

The operator selects paper by touching the portion where desired paper is displayed in the paper list 410 displayed on the operation panel 120. The selected paper is displayed in a different way to be distinguished from unselected paper. For example, the selected paper is displayed more brightly than unselected paper. As illustrated in FIG. 4, when "XYZ Paper Color Paper 81" is selected, each column of "XYZ Paper Color Paper 81" is displayed in a different way from other unselected paper. When the number of paper types managed by the paper library is larger than the number of paper types displayable at one time in the paper list 410, the operator can select other paper by operating a scroll bar 417.

The "NEW" button 420 is used to add new paper to the paper library. The "EDIT" button 421 is used to edit information of the paper selected in the paper list 410 by the operator. The "DELETE" button 422 is used to delete from the paper library the paper selected in the paper list 410 by the operator. The "SELECT" button 423 is used to associate the paper selected in the paper list 410 with a sheet deck.

When the operator presses the "NEW" button 420 or the "EDIT" button 421, an interface screen (FIG. 5) for inputting paper information is displayed on the operation panel 120. An interface (paper attributes) screen 500 includes text boxes 501 to 504, combo boxes 505 and 506, a check box 507, an "END EDITING" button 520, and a "CANCEL" button 521.

The text box 501 is an input area for inputting the name of paper. The text box 502 is an input area for inputting the width. The text box 503 is an input area for inputting the length. The text box 504 is an input area for inputting the grammage of paper. Information is input to the text boxes 501 to 504 through a software keyboard or input keys provided on the operation panel 120.

The combo box 505 is an area for specifying the surface nature of paper. The operator specifies the surface nature of paper out of a plurality of types of surface nature. Information of a plurality of types of surface nature is preregistered. The combo box 506 is an area for specifying the color of paper. The operator specifies the color of paper out of a plurality of colors. Information of a plurality of colors is preregistered. The check box 507 is an area for specifying whether paper is preprint paper. When the paper is preprint paper, the operator checks the check box 507.

The "END EDITING" button 520 is used to store in the paper library the information of the paper input in the interface screen 500. When the operator presses the "END EDITING" button 520, the information of paper input at the depression timing is stored in the paper library. After the information of paper is stored in the paper library, the interface screen 500 changes to the interface screen 400 illustrated in FIG. 4. The "CANCEL" button 521 is used to change to the interface screen 400 illustrated in FIG. 4 without storing in the paper library the information of paper input in the interface screen 500. When the operator presses the "CANCEL" button 521, the edited information of paper is cancelled.

FIG. 6 illustrates the paper library. The paper library is stored as digital information. The digital information refers to, for example, information described by using the Extensible Markup Language (XML). The digital information also refers to, for example, information described in the Comma Separated Values (CSV) format.

Rows 601 to 605 indicate information of paper registered in the paper library. Columns 611 to 619 indicate paper attributes. The column 611 indicates the name of paper. The columns 612 to 615 indicate the physical characteristics of paper. The column 612 indicates the width of paper, the column 613 indicates the length of paper, the column 614 indicates the grammage of paper, and the column 615 indicates the surface nature of paper. The column 616 indicates the color of paper. The column 617 indicates whether the paper is preprint paper.

The columns 618 and 619 indicate print position deviation amounts on the front and the back surfaces of paper, respectively. A print position deviation amount refers to a value which quantitatively indicates the deviation between a predicted printing area predicted from the result of reading a test sheet and an ideal printing area. The ideal printing area is a rectangle having four sides with predetermined lengths. One side of a printing area is parallel to a predetermined side of paper, and the distance between the predetermined side of paper and one side of the printing area parallel to the predetermined side of paper is a predetermined distance.

The print position deviation amounts are represented by parameters including the rectangular correction amount, trapezoidal correction amount, lead position, side position, longitudinal magnification, and widthwise magnification. The rectangular correction amount indicates the amount of deviation of an arbitrary angle of the printing area from right angle. For example, the rectangular correction amount refers to the amount of deviation between an ideal perpendicular line calculated with respect to a straight line of the printing area printed in the longitudinal direction and a straight line printed in the widthwise direction. The trapezoidal correction amount refers to the expansion/contraction deviation amount of a print sheet. For example, the trapezoidal correction amount refers to the amount of deviation between a straight line printed in the widthwise direction from the printing start position to the widthwise trailing edge and a straight line printed in the widthwise direction from the longitudinal trailing edge position to the widthwise trailing edge of the print sheet. The lead and the side positions indicate print position deviation amounts in the widthwise and the longitudinal directions of the print sheet, respectively.

The lead position is adjusted by changing the printing start position of the image with respect to the leading edge of paper in the conveyance direction. The side position is adjusted by changing the printing start position of the image with respect to an edge of paper parallel to the conveyance direction. More specifically, adjusting the timing of starting irradiation of laser light to be emitted to the photosensitive drum 153 by the exposure device 223 enables adjusting the lead and the side positions. For example, the CPU 114 controls the exposure device 223 to adjust the timing of starting irradiation of laser light.

The widthwise magnification indicates a deviation (magnification) of the actual width of the printing area with respect to the ideal width. More specifically, the widthwise magnification is adjusted by controlling the rotational speed of the photosensitive drum 153 or the rotational speed of the intermediate transfer belt 154. For example, the CPU 114 adjusts the rotational speed of a motor (not illustrated) for rotating the photosensitive drum 153. For example, the CPU 114 adjusts the rotational speed of a motor (not illustrated) for rotating the intermediate transfer belt 154. The longitudinal magnification indicates a deviation (magnification) of the actual longitudinal length of the printing area with respect to the ideal longitudinal length. More specifically, the longitudinal magnification is adjusted by controlling the clock frequency of laser light when the exposure device 223 modulates laser light based on image data. For example, the CPU 114 controls the exposure device 223 to control the clock frequency. Alternatively, the CPU 114 may be configured to perform image processing on the image data so that the ideal print positions of the output image are achieved. Image processing for achieving the ideal print positions of the output image is, for example, image processing such as an affine transformation.

When forming an output image on paper based on a print job, the controller 110 adjusts the print position based on the print position deviation amounts so that an image is formed at the ideal print positions on paper. Referring to the print position deviation amounts in the paper library, the controller 110 performs image processing on the image data so that the ideal print positions are achieved. Then, the controller 110 controls the printer 150 to print an image on the target paper based on the image data applied with image processing.

An initial value of each item of the print position deviation amounts is 0. When new paper is registered in the paper library or when print position adjustment is not performed even if paper is registered, the initial value is used as each item of the print position deviation amounts.

(Test Sheet)

FIG. 7 schematically illustrates a test sheet. The printer 150 prints an adjustment chart 700 on the first surface of a print sheet and prints an adjustment chart 701 on the second surface of the print sheet. The adjustment charts 700 and 701 include correction marks 720. The correction marks 720 are positioned at the four corners of the adjustment charts 700 and 701. The correction marks 720 are formed using a black toner. Since the difference between the intensity of reflected light from a correction mark 720 and the intensity of reflected light from paper increases, the outline of the correction mark 720 can be detected with a high accuracy as a result of reading the sensing device 160.

If the print position is an ideal position, the distances from paper edges to the correction mark 720 become predetermined distances. The controller 110 measures the positions of the correction marks 720 on paper to detect the print position deviation amounts. Referring to FIG. 7, the controller 110 measures lengths (A) to (V) based on the result of reading the sensing device 160. The controller 110 controls the line sensors 312a and 312b to read a test sheet. Subsequently, the controller 110 detects paper edges and the edges of the correction marks 720 (boundaries between paper and the correction marks 720) based on the density difference of the scan image on the test sheet. Then, the controller 110 counts the number of read pixels from the detected paper edges to the edges of the correction marks 720 and calculates the lengths (A) to (V) based on the count values.

The lengths (A) and (B) are the widthwise and the longitudinal lengths of the test chart, respectively. Ideal lengths of the lengths (A) and (B) are equivalent to the paper lengths specified for each paper size. The lengths (C) to (V) are equivalent to the distances (lengths) from paper edges to the adjacent correction marks 720.

An image 710 is printed on the adjustment chart 700. An image 711 is printed on the adjustment chart 701. The images 710 and 711 include an image having a shape of an arrow which allows the operator to identify the adjustment chart conveyance direction. The images 710 and 711 include a text image which allows the operator to identify the front and the back surfaces of the adjustment chart. The images 710 and 711 are not directly related to the derivation of the print position deviation amounts, and thus do not need to be printed on paper.

When print position adjustment is performed, the printer 150 prints an adjustment chart, the operator places the adjustment chart on a scanner, and the scanner reads a scan image of the adjustment chart. In the above-described configuration, the images 710 and 711 printed on the adjustment chart makes it possible to prevent the possibility that the operator places the adjustment chart on the scanner in a wrong orientation (the front and the back surfaces and four directions).

(Methods for Determining Print Position Deviation Amounts)

FIG. 8 schematically illustrates methods for calculating the print position deviation amounts based on actual measurement values of the lengths (A) to (V). Items 801 to 812 indicate respective print position deviation amounts. Parameters of the adjustment chart 700 include a lead position 801, a side position 802, a longitudinal magnification 803, a widthwise magnification 804, a rectangular correction amount 805, and a trapezoidal correction amount 806. Parameters of the adjustment chart 701 include a lead position 807, a side position 808, a longitudinal magnification 809, a widthwise magnification 810, a rectangular correction amount 811, and a trapezoidal correction amount 812.

For the adjustment charts 700 and 701, measured values 820 and print position deviation amounts 822 are calculated based on similar formulas. Similar ideal values are set to similar types of parameters for the adjustment charts 700 and 701. The measured values 820 are calculated based on formulas set for respective items using actual measurement values of the lengths (A) to (V) illustrated in FIG. 7.

The measured value 820 of the lead position 801 (807) is equivalent to the average value of the distances C and E (K and M) from the leading edge in the paper conveyance direction to the adjacent correction marks 720. The measured value 820 of the side position 802 (808) is equivalent to the average value of the distances F and J (N and R) from the left-hand side edge to the adjacent correction marks 720 in the paper conveyance direction (FIG. 7). The measured value 820 of the longitudinal magnification 803 (809) is equivalent to the average value of the distances between the correction marks 720 arranged on the same line in the longitudinal direction. The measured value 820 of the widthwise magnification 804 (810) is equivalent to the average value of the distances between the correction marks 720 arranged on the same line in the widthwise direction. When lines perpendicular to the straight line connecting the correction marks 720 on the leading edge in the paper conveyance direction are used as reference lines, the measured value 820 of the rectangular correction amount 805 (811) is equivalent to the widthwise deviation amounts S and T (U and V) of the correction marks 720 on the trailing edge side in the paper conveyance direction from the above-described reference lines. The measured value 820 of the trapezoidal correction amount 806 (812) is equivalent to the difference between two different distances: the distance between the correction marks 720 arranged on the leading edge side in the paper conveyance direction, and the distance between the correction marks 720 arranged on the trailing edge side in the paper conveyance direction.

A column 821 indicates ideal values of corresponding items. Ideally, the correction marks 720 are printed at positions separated from the corresponding paper edges by respective ideal values. For example, the ideal values of the lead and the side positions are 1 centimeters (cm). The ideal value of the longitudinal magnification is, for example, 2-cm shorter than the length of the paper registered in the paper library. The ideal value of the widthwise magnification is, for example, 2-cm shorter than the width of the paper registered in the paper library.

A column 822 indicates a formula for calculating each item of the final print position deviation amounts based on the measured values 820 and the ideal values indicated by the column 821. For each of the lead and side positions, the print position deviation amount (in millimeters (mm)) is calculated by subtracting the ideal value from the measured value. For each of the longitudinal and the widthwise magnifications, the print position deviation amount (in percentage) is calculated by subtracting the ideal value from the measured value and dividing the resultant value by the ideal value. For the rectangular correction amount and the trapezoidal correction amount, the measured value is used as it is. The calculated print position deviation amounts are stored in the paper library (FIG. 6).

As described above, the print position deviation amounts are calculated based on the length and the width of paper and the distances from the paper edges. However, according to the inventor's experiment, it turned out that the paper deformation amount on the test sheet illustrated in FIG. 7 differs from the paper deformation amount of a sheet with an output image actually formed thereon. This difference is caused by the fact that the paper deformation amount depends on the adhesion amount of toner. Accordingly, the amount of toner adhered to paper with an output image printed thereon will differ according to the type of the output image. For example, when printing a photographic image on the entire surface of a print sheet, the amount of toner adhered to the print sheet is larger than the amount of toner adhered to a test sheet. Thus, even if print position deviation amounts are obtained by using a test sheet with the correction marks 720 printed thereon, the ideal print positions of the output image may not be achieved.

The image forming apparatus 100 forms other marks at positions not overlapping with the correction marks 720 and performs print position adjustment by using a test sheet suitable for the amount of toner adhered to the paper with an output image actually formed thereon. Even if other marks are printed at positions not overlapping with the correction marks 720, the print position deviation amounts can be calculated.

Figure 11A:
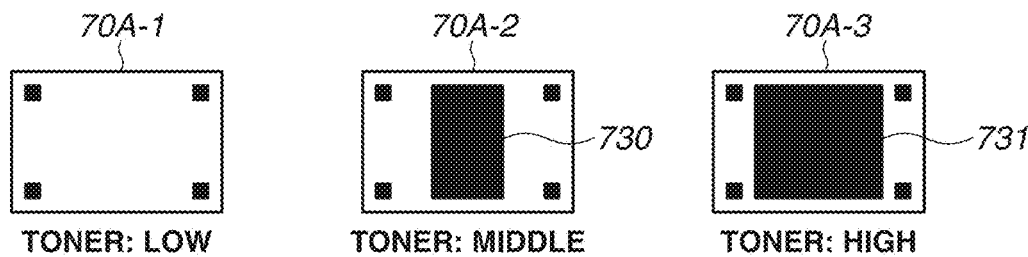
FIGS. 11A, 11B, and 11C schematically illustrate examples of adjustment charts.
Figure 11B:
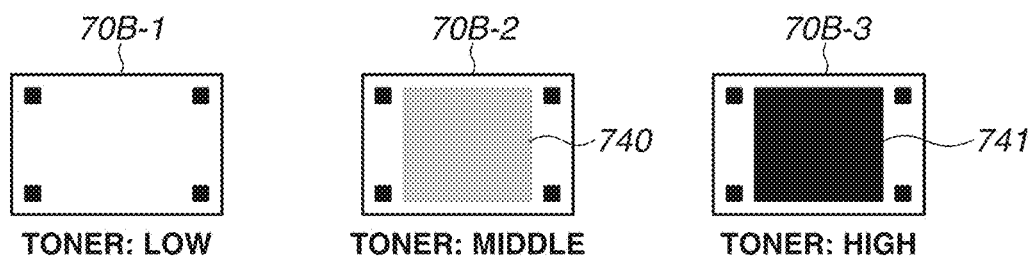
Figure 11C:
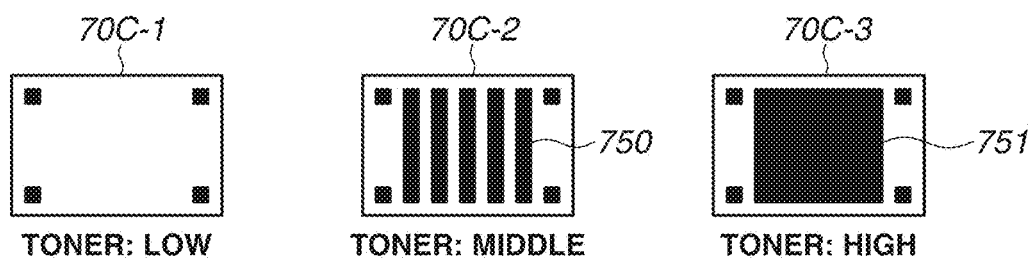

FIGS. 11A to 11C schematically illustrate adjustment charts for reproducing a contraction of paper caused by the difference in the adhesion amount of toner. The image forming apparatus 100 performs print position adjustment by using an adjustment chart suitable for the amount of toner adhered to the output image out of three different adjustment charts 70A-1, 70A-2, and 70A-3 illustrated in FIG. 11A. Adjustment image data for causing the printer 150 to print the adjustment charts 70A-1, 70A-2, and 70A-3 is prestored in the HDD 115.

The adjustment chart 70A-1 includes only correction marks. The adjustment chart 70A-2 includes the correction marks and a rectangular pattern 730 which is formed at a different position from the correction marks. The adjustment chart 70A-3 includes the correction marks and a rectangular pattern 731 which is formed at a different position from the correction marks.

The patterns 730 and 731 are toner images having the maximum density (hereinafter referred to as a 100% toner density) formed based on a 100% image signal value. The area of the pattern 730 is smaller than the area of the pattern 731. Accordingly, the adjustment chart 70A-3 has the largest adhesion amount of toner out of the adjustment charts 70A-1, 70A-2, and 70A-3, and the adjustment chart 70A-1 has the smallest adhesion amount of toner out of the adjustment charts 70A-1, 70A-2, and 70A-3.

Three different adjustment charts 70B-1, 70B-2 and 70B-3 illustrated in FIG. 11B, and three different adjustment charts 70C-1, 70C-2 and 70C-3 illustrated in FIG. 11C are modifications of the adjustment charts 70A-1, 70A-2, and 70A-3, respectively.

The adjustment chart 70B-1 includes only correction marks. The adjustment chart 70B-2 includes the correction marks and a rectangular pattern 740 which is formed at a different position from the correction marks. The pattern 740 is a toner image formed based on a 25% image signal value. The adjustment chart 70B-3 includes the correction marks and a rectangular pattern 741 which is formed at a different position from the correction marks. The pattern 741 is a toner image formed based on a 100% image signal value. The patterns 740 and 741 are toner images having the same area, and are formed based on different image signal values. The toner density of the pattern 740 is lower than the toner density of the pattern 741. Accordingly, the amount of toner adhered to the adjustment chart 70B-2 is larger than the amount of toner adhered to the adjustment chart 70B-1 and is smaller than the amount of toner adhered to the adjustment chart 70B-3.

The adjustment chart 70C-1 includes only correction marks. The adjustment chart 70C-2 includes the correction marks and a plurality of oblong patterns 750. The patterns 750 are toner images formed based on a 100% image signal value. The adjustment chart 70C-3 includes the correction marks and a rectangular pattern 751 which is formed at a different position from the correction marks. The pattern 751 is a toner image formed based on a 100% image signal value. The sum total of the areas of a plurality of patterns 750 occupying the entire area of paper is smaller than the area of the pattern 751 printed on paper. Accordingly, the amount of toner adhered to the adjustment chart 70C-2 is larger than the amount of toner adhered to the adjustment chart 70C-1, and is smaller than the amount of toner adhered to the adjustment chart 70C-3.

(Operation Panel)

Figure 9:
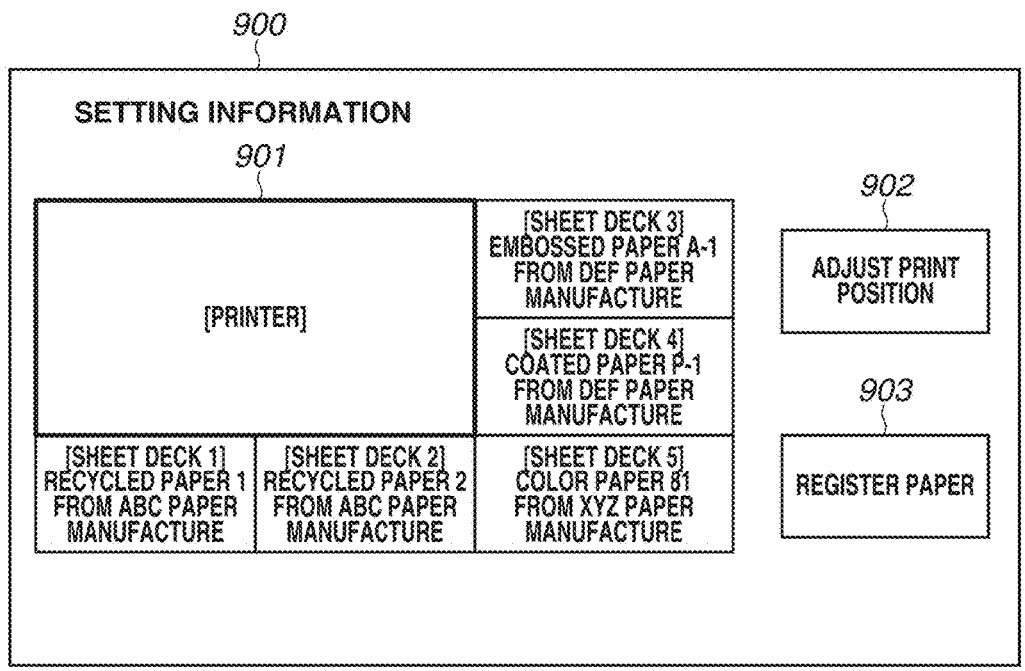
FIG. 9 illustrates a paper type setting screen.

FIG. 9 illustrates a paper type setting (setting information) screen 900 displayed on the operation panel 120. The paper type setting screen 900 displays a sheet deck setting status 901, an "ADJUST PRINT POSITION" button 902, and a "REGISTER PAPER" button 903. The sheet deck setting status 901 displays the paper type registered to each sheet deck. Referring to FIG. 9, a sheet deck 1 corresponds to the sheet deck 140a (FIG. 1), a sheet deck 2 corresponds to the sheet deck 140b (FIG. 1), a sheet deck 3 corresponds to the sheet deck 140c (FIG. 1), a sheet deck 4 corresponds to the sheet deck 140d (FIG. 1), and a sheet deck 5 corresponds to the sheet deck 140e (FIG. 1).

Referring to FIG. 9, the recycled paper 1 from ABC paper manufacture, the recycled paper 2 from ABC paper manufacture, the embossed paper A-1 from DEF paper manufacture, the coated paper P-1 from DEF paper manufacture, and the color paper 81 from XYZ paper manufacture are registered to the five sheet decks, respectively. The "ADJUST PRINT POSITION" button 902 is used to change to the screen illustrated in FIG. 10 (described below). The "REGISTER PAPER" button 903 is used to register the paper type to the selected sheet deck. When the operator presses the "REGISTER PAPER" button 903, a paper library editing screen illustrated in FIG. 4 is displayed. When the operator presses the "SELECT" button 423, the paper selected in the paper library editing screen is registered to the sheet deck selected by the operator. If no sheet deck is selected in the sheet deck setting status 901, the "ADJUST PRINT POSITION" button 902 and the "REGISTER PAPER" button 903 cannot be pressed.

Figure 10:
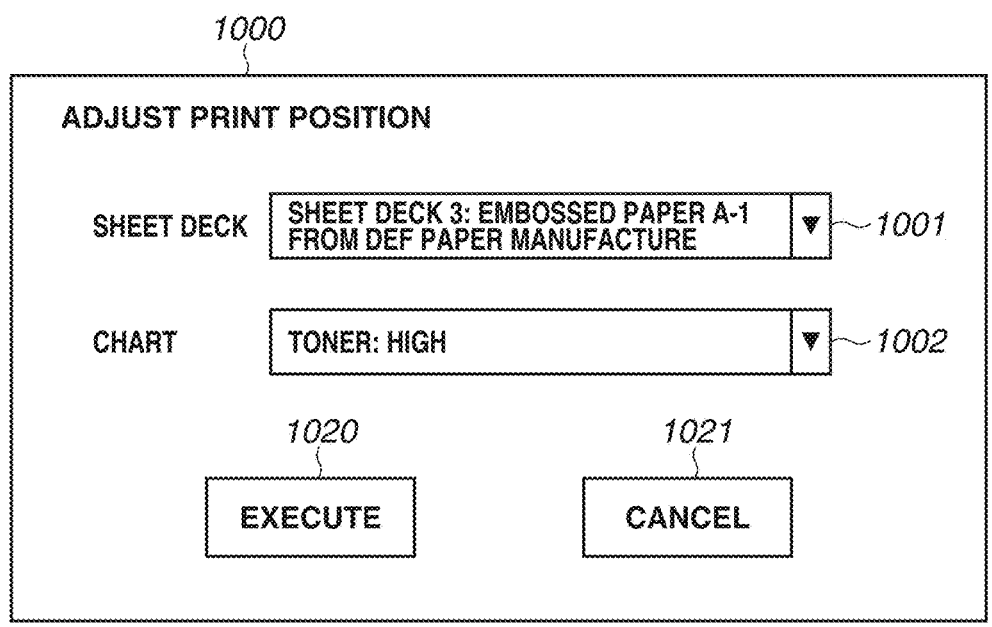
FIG. 10 illustrates a print position adjustment setting screen.

FIG. 10 illustrates a print position adjustment screen 1000 displayed on the operation panel 120. The print position adjustment screen 1000 is displayed when the "ADJUST PRINT POSITION" button 902 (FIG. 9) is pressed. The print position adjustment screen 1000 includes a sheet deck selection 1001, a chart selection 1002, an "EXECUTE" button 1020, and a "CANCEL" button 1021. The sheet deck selection 1001 is a combo box for specifying a sheet deck. This combo box allows the operator to select one of the five different sheet decks 1 to 5 illustrated in FIG. 9 and displays the paper type registered to the selected sheet deck. The chart selection 1002 is a combo box for specifying an adjustment chart. This combo box allows the operator to select one of the three different adjustment charts ("Toner: HIGH", "Toner: MIDDLE", and "Toner: LOW") illustrated in FIGS. 11A, 11B, and 11C, respectively. The "EXECUTE" button 1020 is used to perform print position adjustment on the paper stored in the sheet deck selected with the sheet deck selection 1001 by using the adjustment chart selected with the chart selection 1002. When the operator presses the "EXECUTE" button 1020, the controller 110 starts processing of print position adjustment. The "CANCEL" button 1021 is used to cancel print position adjustment. When the operator presses the "CANCEL" button 1021, the processing of print position adjustment is cancelled and the paper type setting screen 900 is redisplayed.

(Print Position Adjustment)

Figure 12:
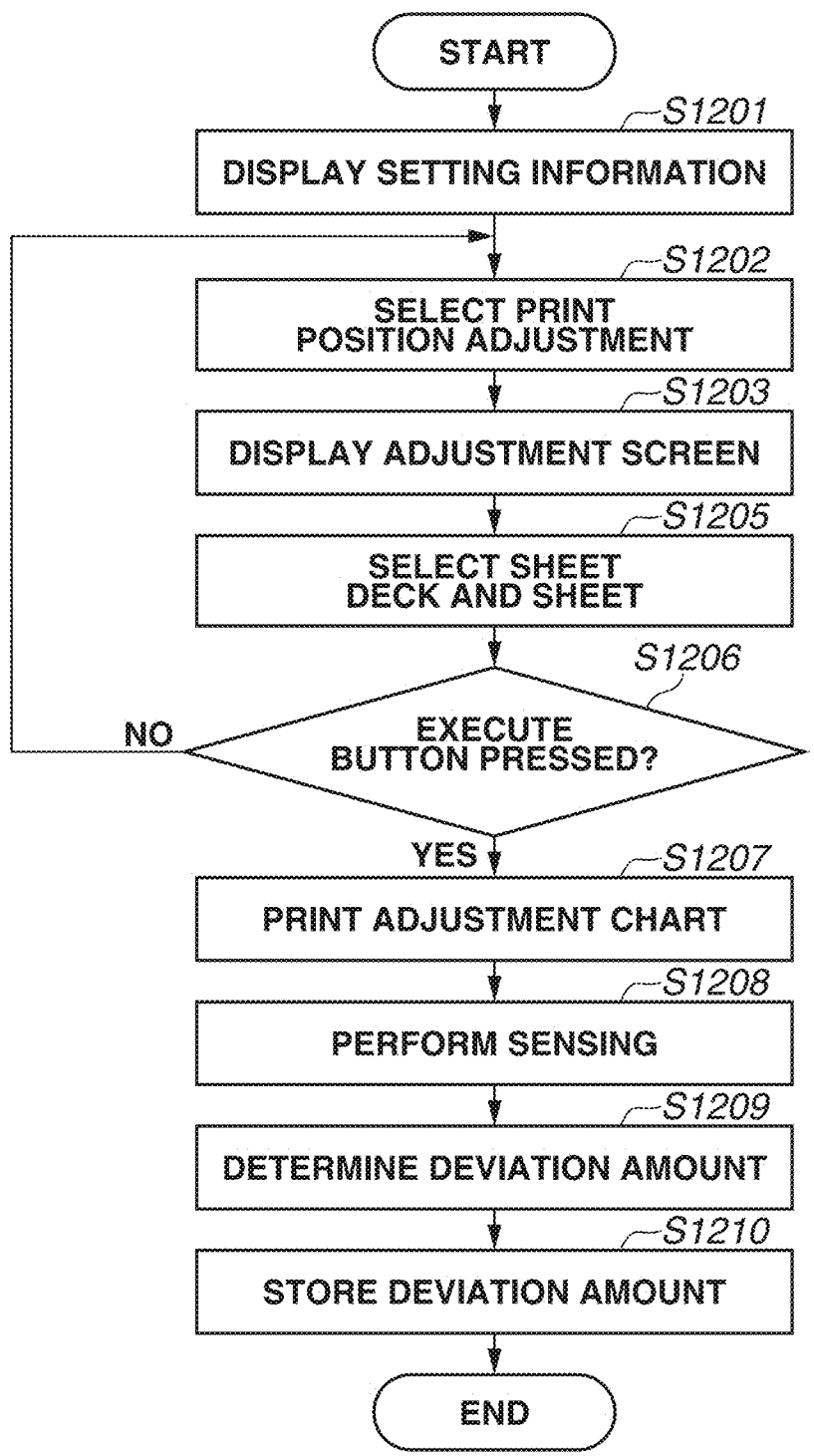
FIG. 12 is a flowchart illustrating print position adjustment.

Print position adjustment performed by the CPU 114 of the image forming apparatus 100 will be described below with reference to the flowchart illustrated in FIG. 12. Control steps in the flowchart are implemented by the CPU 114 reading a program stored in the ROM 112 and then executing the program.

Examples of print position adjustment by using adjustment charts illustrated in FIG. 11A will be described below. Print position adjustments using the adjustment charts illustrated in FIGS. 11B and 11C are similar to the above-described examples, and redundant descriptions thereof will be omitted. In print position adjustment illustrated in FIG. 12, the operator selects an adjustment chart suitable for an output image to be printed from the three different adjustment charts illustrated in FIG. 11A. This enables obtaining the print position deviation amounts arising in an actual print product with a high accuracy, and obtaining adjustment values of the print position suitable for the output image that the operator wants to actually print.

In step S1201, when the operator requests the image forming apparatus 100 to display the paper type setting screen 900 (FIG. 9) via the operation panel 120, the CPU 114 displays the paper type setting screen 900 on the operation panel 120. In step S1202, the CPU 114 waits until the operator presses the "ADJUST PRINT POSITION" button 902. In step S1203, when the operator presses the "ADJUST PRINT POSITION" button 902, the CPU 114 displays the print position adjustment screen 1000 on the operation panel 120. In step S1205, the CPU 114 waits until the "EXECUTE" button 1020 or the "CANCEL" button 1021 is pressed.

In step S1205, the operator selects the sheet deck storing the paper subjected to print position adjustment and a type of adjustment chart. In this case, the operator selects from the three different adjustment charts an adjustment chart suitable for the output image to be printed after execution of print position adjustment. For example, when printing a photograph on the entire area of a print sheet, the operator selects the adjustment chart 70A-3. For example, when printing a photograph on approximately a half of the area of the print sheet, the operator selects the adjustment chart 70A-2. For example, when printing only texts without photograph on the print sheet, the operator selects the adjustment chart 70A-3.

In step S1206, the CPU 114 determines whether the button pressed in step S1205 is the "EXECUTE" button 1020. When the operator presses the "CANCEL" button 1021 (NO in step S1206), the processing returns to step S1202.

On the other hand, when the operator presses the "EXECUTE" button 1020 (YES in step S1206), the processing proceeds to S1207. In step S1207, the CPU 114 controls the printer 150 to print the adjustment chart selected by the operator on the paper stored in the sheet deck selected by the operator. For example, when the operator selects the embossed paper A-1 from DEF paper manufacture in the sheet deck 3 and the adjustment chart 70A-3, the printer 150 prints the adjustment chart 70A-3 on the paper stored in the sheet deck 140c. After the printer 150 prints the adjustment chart 70A-3 on the front surface of the paper, the flapper 132 and conveyance rollers convey the test sheet toward the reversing unit 136. In the printer 150, after the reversing unit 136 reverses the test sheet, the flapper 133 and the conveyance rollers convey the test sheet to the conveyance path 138. Then, the printer 150 prints the adjustment chart 70A-3 again on the back surface of the test sheet. Then, the printer 150 conveys the test sheet to the sensing device 160. The paper stored in the selected sheet deck is equivalent to target paper.

In step S1208, the CPU 114 controls the sensing device 160 to read the adjustment charts 700 and 701 on the test sheet. The CPU 114 reads the test sheet via the line sensors 312a and 312b while conveying the test sheet with the conveyance rollers of the sensing device 160. The test sheet is discharged from the sensing device 160 onto the discharge tray of the finisher 190.

In step S1209, the CPU 114 acquires a result of reading the test sheet via the sensing device 160 in step S1208 and calculates the print position deviation amounts based on the result of reading and the calculation methods illustrated in FIG. 8. In step S1210, the CPU 114 stores the print position deviation amounts calculated in step S1209 in the paper library, in association with the print paper in the sheet deck selected by the operator, and ends the processing of print position adjustment. More specifically, the calculated print position deviation amounts are stored in the calculated print position deviation amount (front surface) 618 and the print position deviation amount (back surface) 619 of "Embossed Paper A-1 from DEF Paper Manufacture" 603 in the paper library illustrated in FIG. 6.

The image forming processing performed by the CPU 114 of the image forming apparatus 100 will be described below with reference to the flowchart illustrated in FIG. 3. Steps of the flowchart illustrated in FIG. 3 are implemented by the CPU 114 reading a program stored in the ROM 112 and then executing the program.

In step S100, when a print job is input from the host computer 101, the CPU 114 acquires information related to the paper type included in a print job. In step S101, based on the information acquired in step S100, the CPU 114 determines whether the print position deviation amounts of the paper specified in the print job are stored in the paper library. In step S101, referring to the paper library, the CPU 114 determines whether the print position deviation amounts of the specified paper are values other than the initial value 0.

When the print position deviation amounts of the paper specified in step S101 are values other than the initial value 0 (YES in step S101), the processing proceeds to step S102. In step S102, the CPU 114 reads the print position deviation amounts of the specified paper. In step S103, the CPU 114 rasterizes the image data included in the print job into a bitmap image, and performs an affine transformation on the bitmap image based on the print position deviation amounts. In step S104, the CPU 114 controls the printer 150 to feed the specified paper from the sheet feeder 140 and forms an output image on the fed paper based on the bitmap image. Then, the CPU 114 ends the image forming processing.

On the other hand, when the print position deviation amounts of the paper specified in step S101 are the initial value 0 (NO in step S101), the processing proceeds to step S104. In this case, an affine transformation based on the print position deviation amounts is not performed on the image data. Then, the CPU 114 controls the printer 150 to feed the specified paper, forms an output image on the specified paper based on the image data, and ends the image forming processing.

With the above-described processing, the operator can obtain the print position deviation amounts for different adhesion amounts of toner, by selecting an adjustment chart from a plurality of adjustment charts with different adhesion amounts of toner.

(Modifications)

A modification of print position adjustment (described below) is provided with a function of automatically determining an adjustment chart suitable for an output image and notifying the operator of the suitable adjustment chart. For elements of a modification to be described below equivalent to those of the above-described image forming apparatus 100, redundant descriptions will be omitted.

FIGS. 13A to 13C illustrate application screens displayed on the operation panel 120. A job printing application screen 1300 illustrated in FIG. 13A displays a print job list 1310 and a "JOB ACTION" 1320.

The print job list 1310 displays a print job input from the host computer 101 in list form. The print job list 1310 displays the number of pages to be printed, number of copies, and information related to one-sided/double-sided printing for each print job.

The "JOB ACTION" 1320 displays actions to be executed in the print jobs displayed in the print job list 1310. The "JOB ACTION" 1320 includes a "PRINT" button 1321, a "RIP" button 1322, an "ADJUST PRINT POSITION" button 1323, and a "JOB PROPERTIES" button 1324. The "PRINT" button 1321 is used to instruct the image forming apparatus 100 to print the print job selected from the print job list 1310 by the operator. The "RIP" button 1322 is used to instruct the image forming apparatus 100 to perform rendering on the print job selected from the print job list 1310 by the operator. The "ADJUST PRINT POSITION" 1323 is used to instruct the image forming apparatus 100 to perform print position adjustment on the paper specified in the print job selected from the print job list 1310 by the operator. When the operator presses the "ADJUST PRINT POSITION" button 1323, the operation panel 120 displays a print position adjustment screen 1330 illustrated in FIG. 13B. The "JOB PROPERTIES" button 1324 is used to display print settings for the print job selected from the print job list 1310 by the operator. When the operator presses the "JOB PROPERTIES" button 1324, the operation panel 120 displays a job setting list (not illustrated). The job setting list includes the number of copies and information related to one-sided/double-sided printing.

When no job is selected from the print job list 1310, the display of the operation panel 120 remains unchanged if the operator presses the "PRINT" button 1321, the "RIP" button 1322, the "ADJUST PRINT POSITION" button 1323, or the "JOB PROPERTIES" button 1324.

The print position adjustment screen 1330 illustrated in FIG. 13B displays a print image display portion 1331, an adjustment chart display portion 1332, a scroll bar 1333, an "EXECUTE" button 1340, a "SELECT CHART" button 1341, and a "CANCEL" button 1342.

The print image display portion 1331 displays the front surface image of the selected job. The adjustment chart display portion 1332 displays an adjustment chart suitable for the front surface image displayed in the print image display portion 1331. The adjustment chart display portion 1332 displays one of the adjustment charts 70A-1, 70A-2 and 70A-3. Although the adjustment chart display portion 1332 displays one of the adjustment charts 70A-1, 70A-2 and 70A-3, the adjustment chart display portion 1332 may be configured to display one of the adjustment charts 70B-1, 70B-2 and 70B-3. The adjustment chart display portion 1332 may be configured to display one of the adjustment charts 70C-1, 70C-2 and 70C-3.

The scroll bar 1333 is displayed when the front surface image in the print image display portion 1331 and the adjustment chart in the adjustment chart display portion 1332 cannot be displayed at one time. When the operator operates the scroll bar 1333, the operator can confirm all of the front surface images and adjustment charts. The "EXECUTE" button 1340 is used to perform print position adjustment by using the adjustment chart displayed in the adjustment chart display portion 1332. When the operator presses the "EXECUTE" button 1340, the CPU 114 starts processing of print position adjustment.

The "SELECT CHART" button 1341 is used to allow the operator to select the adjustment chart corresponding to the front surface image. When no front surface image in the print image display portion 1331 is selected, the "SELECT CHART" button 1341 is grayed out and cannot be pressed. When the operator presses the "SELECT CHART" button 1341 in a state where one front surface image is selected from the print image display portion 1331, a chart selection screen 1350 illustrated in FIG. 13C is displayed on the operation panel 120. A "CANCEL" button 1342 is used to cancel print position adjustment.

FIG. 13C illustrates the chart selection screen 1350 which displays an adjustment chart selection portion 1351, an "APPLY" button 1360, and a "CANCEL" button 1361. The adjustment chart selection portion 1351 displays the three different adjustment charts 70A-1, 70A-2, and 70A-3. Although the adjustment chart selection portion 1351 displays the adjustment charts 70A-1, 70A-2, and 70A-3, the adjustment chart selection portion 1351 may be configured to display the adjustment charts 70B-1, 70B-2, and 70B-3. The adjustment chart selection portion 1351 may be configured to display the adjustment charts 70C-1, 70C-2, and 70C-3.

When no adjustment chart in the adjustment chart selection portion 1351 is selected, the "APPLY" button 1360 is grayed out and cannot be pressed. When the operator presses the "APPLY" button 1360 in a state where any one adjustment chart in the adjustment chart selection portion 1351 is selected, the adjustment chart is applied and the print position adjustment screen 1330 illustrated in FIG. 13B is redisplayed. The "CANCEL" button 1361 is used to cancel chart selection.

FIG. 14 illustrates a determination table for determining an adjustment chart based on the print image.

The determination table illustrated in FIG. 14 is generated based on the data obtained through an experiment. Since the paper deformation amount depends on the physical properties such as the hygroscopicity of paper, it is desirable to generate a determination table based on the result of an experiment performed for each print sheet.

According to the experiment, when print position adjustment was performed by using the adjustment chart 70A-1, the print position deviation amounts were within allowable ranges even after an output image with a toner density of 5% or less was printed on the entire surface of the paper. According to another experiment, when print position adjustment was performed by using the adjustment chart 70A-1, the print position deviation amounts were within allowable ranges even after an image with a length of 200.0 mm or less in the paper conveyance direction and a 100% toner density was printed on the paper. The determination table illustrated in FIG. 14 reflects the above-described experimental results. This means that, in cases other than the above-described ones, it is desirable to perform print position adjustment by using the adjustment chart 70A-2 or 70A-3. Then, the CPU 114 generates a histogram of the adhesion amount of toner in the paper conveyance direction, and a histogram of the adhesion amount of toner in the direction perpendicularly intersecting with the paper conveyance direction, and selects a suitable adjustment chart based on these histograms.

First of all, the CPU 114 rasterizes image data to generate a bitmap image. Then, the CPU 114 extracts the area of a density range 1 (25 to 100%) and the area of a density range 2 (5 to 25%) from the bitmap image. For example, the CPU 114 converts the bitmap image into data of two different values (binarized image) of the above-described area of the density range 1 and the area of other than the density range 1, and extracts the area of the density range 1. Likewise, the CPU 114 converts the bitmap image into data of two different values (binarized image) of the area of the density range 2 and the area of other than the density range 2, and extracts the area of the density range 2. Then, the CPU 114 selects an adjustment chart according to the length of the area of the density range 1 in the conveyance direction and the length of the area of the density range 2 in the conveyance direction.

The determination table illustrated in FIG. 14 is designed so that the adjustment chart 70A-3 is selected when the amount of toner adhered to the output image is larger than a predetermined amount and the length of the printing area in the conveyance direction is longer than a predetermined length. The determination table illustrated in FIG. 14 is designed so that the adjustment chart 70A-1 is selected when the amount of toner adhered to the output image is smaller than a predetermined amount and the length of the printing area in the conveyance direction is shorter than the predetermined length.

A modification of print position adjustment performed by the CPU 114 of the image forming apparatus 100 will be described below with reference to the flowchart illustrated in FIG. 15. Control steps in the flowchart illustrated in FIG. 15 are implemented by the CPU 114 reading a program stored in the ROM 112 and then executing the program.

In step S1501, when the operator requests the image forming apparatus 100 to display the print job list 1310 (FIG. 13A) via the operation panel 120, the CPU 114 displays the print job list 1310 on the operation panel 120. In step S1502, the CPU 114 waits until the operator presses the "ADJUST PRINT POSITION" button 1323. In step S1504, when the operator presses the "ADJUST PRINT POSITION" button 1323, the CPU 114 acquires image data included in the selected print job. In step S1505, the CPU 114 generates a bitmap image based on the image data acquired in step S1504.

In step S1506, the CPU 114 converts the bitmap image generated in step S1505 into a binarized image including data of two different values of the area of the density range 1 and the area of other than the density range 1, and generates a histogram in terms of the conveyance direction and the direction perpendicularly intersecting with the conveyance direction. In step S1507, the CPU 114 selects an adjustment chart based on the maximum value of the histogram generated in step S1506. The adjustment chart selected in step S1507 is referred to as an adjustment chart 1.

In step S1508, the CPU 114 converts the bitmap image generated in step S1505 into a binarized image including data of two different values of the area of the density range 2 and the area of other than density range 2, and generates a histogram in terms of the conveyance direction and the direction perpendicularly intersecting with the conveyance direction. In step S1509, the CPU 114 selects an adjustment chart based on the maximum value of the histogram generated in step S1508. The adjustment chart selected in step S1509 is referred to as an adjustment chart 2.

In step S1510, the CPU 114 compares the adjustment chart 1 with the adjustment chart 2. When the amount of toner adhered to the adjustment chart 1 is larger than the amount of toner adhered to the adjustment chart 2 (YES in step S1510), the processing proceeds to step S1511. In step S1511, the CPU 114 selects the adjustment chart 1.

On the other hand, when the amount of toner adhered to the adjustment chart 1 is not larger than the amount of toner adhered to the adjustment chart 2 (NO in step S1510), the processing proceeds to step S1512. In step S1512, the CPU 114 selects the adjustment chart 2.

In step S1513, the CPU 114 determine whether adjustment charts are determined for all of the output images included in the print job. When adjustment charts are determined not for all of the output images included in the print job (NO in step S1513), the processing returns to step S1505. The CPU 114 repeats the processing from step S1505 to step S1513 until adjustment charts are determined for all of the output images included in the print job.

When adjustment charts are determined for all of the output images included in the print job (YES in step S1513), in step S1514, the CPU 114 displays the print position adjustment screen 1330 on the operation panel 120. In step S1514, output images to be printed on the front surface of paper out of all of the output images included in the print job are displayed on the print image display portion 1331, and adjustment charts corresponding to the output images to be printed on the front surface of paper are displayed on the adjustment chart display portion 1332.

When the operator presses the "CANCEL" button 1342 in the print position adjustment screen 1330 (YES in step S1515), the CPU 114 cancels the selection result of the adjustment charts corresponding to the output images. Then, the processing returns to step S1502. When the operator presses the "SELECT CHART" button 1341 in the print position adjustment screen 1330 (NO in step S1516), the processing proceeds to step S1517. In step S1517, the CPU 114 displays the chart selection screen 1350 on the operation panel 120.

In step S1518, the CPU 114 determines whether the operator pressed the "APPLY" button 1360 in the chart selection screen 1350. When the operator presses the "APPLY" button 1360 (YES in step S1518), the processing proceeds to step S1519. In step S1519, the CPU 114 sets the adjustment chart selected from the adjustment chart selection portion 1351 as the adjustment chart to be displayed on the print position adjustment screen 1330. Then, the processing returns to step S1514. The adjustment chart display portion 1332 on the operation panel 120 displays the adjustment chart selected by the user.

On the other hand, when the operator presses the "CANCEL" button 1361 in the chart selection screen 1350 (NO in step S1518), the processing returns to step S1514. The adjustment chart display portion 1332 on the operation panel 120 displays the adjustment chart selected in step S1512.

On the other hand, when the operator presses the "EXECUTE" button 1340 in the print position adjustment screen 1330 (YES in step S1516), the processing proceeds to step S1520. In step S1520, the CPU 114 identifies the paper stored in the sheet deck specified in the print job. In step S1521, the CPU 114 controls the printer 150 to print the selected adjustment chart on the paper stored in the sheet deck specified in the print job. In step S1522, the CPU 114 controls the sensing device 160 to read the adjustment chart.

In step S1523, the CPU 114 acquires a result of reading the test sheet via the sensing device 160 in step S1522 and, based on the result of reading, calculates the print position deviation amounts by using the calculation methods illustrated in FIG. 8. In step S1524, the CPU 114 stores the print position deviation amounts calculated in step S1523 in the paper library, in association with the print sheet stored in the sheet deck selected by the operator, and ends the processing of print position adjustment.

Figure 16A:
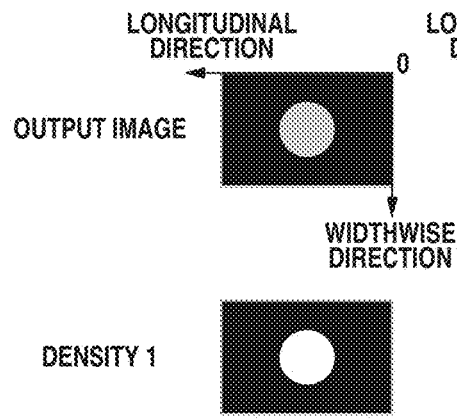
FIGS. 16A, 16B, 16C, 16D, 16E, and 16F schematically illustrate methods for selecting an adjustment chart.
Figure 16B:
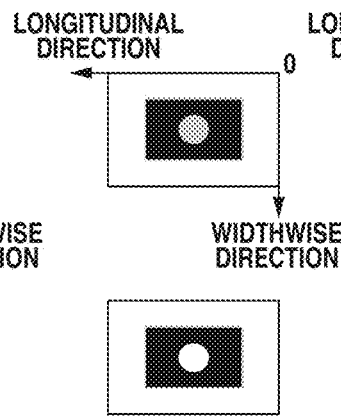
Figure 16C:
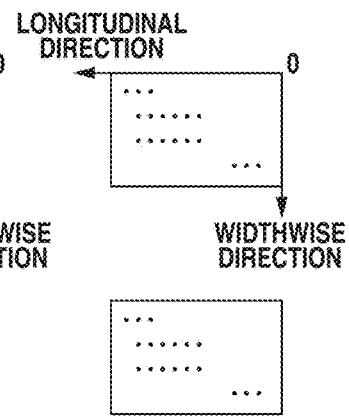

FIGS. 16A to 16F illustrate the operations of the flowchart illustrated in FIG. 15. FIGS. 16A, 16B, and 16C illustrate examples of output images and binarized images. In each of the output images illustrated in FIGS. 16A, 16B, and 16C, a black portion is equivalent to a 100% density and a gray portion is equivalent to a 10% density.

Figure 16D:
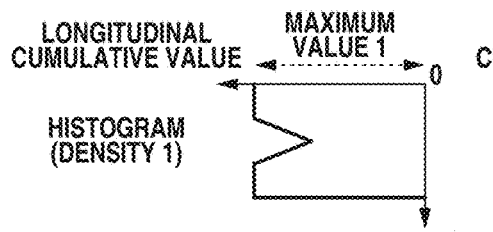
Figure 16E:
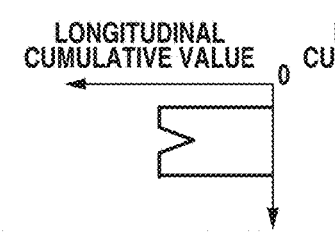
Figure 16F:
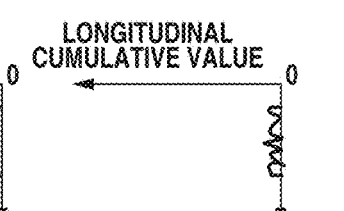

Referring to each of FIGS. 16D, 16E, and 16F, the drawing at the top illustrates a cumulative histogram for a binarized image in the density range 1 (25% to 100%) illustrated in FIGS. 16A, 16B, and 16C, respectively, and the drawing at the bottom illustrates a cumulative histogram for a binarized image in the density range 2 (5% to 25%) illustrated in FIGS. 16A, 16B, and 16C, respectively. In the cumulative histograms, the vertical axis is assigned a distance in the direction perpendicularly intersecting with the conveyance direction, and the horizontal axis is assigned the cumulative value of the density value of the binarized image in the conveyance direction (the density value is either 0 or 100 because of a binarized image). In a cumulative histogram, the number of read pixels with a 100 density value is accumulated in the conveyance direction.

How an adjustment chart is determined will be described below with reference to the print image illustrated in FIG. 16A.

In steps S1501 to S1503, the processing proceeds in similar ways to the descriptions of the flowchart illustrated in FIG. 15.

When the output image illustrated in FIG. 16A is identified in step S1504, then in step S1506, the binarized image with the "Density 1" illustrated in FIG. 16A and the "Histogram (Density 1)" illustrated in FIG. 16D are generated.

In step S1507, the adjustment chart 1 is selected based on the "Histogram (Density 1)" illustrated in FIG. 16D. For example, when the maximum value 1 of the histogram illustrated in FIG. 16D is 300.0 mm or more, the adjustment chart 70A-3 is selected based on the determination table illustrated in FIG. 14.

In step S1508, the binarized image with the "Density 2" illustrated in FIG. 16A and the "Histogram (Density 2)" illustrated in FIG. 16D are generated.

In step S1509, the adjustment chart 2 is selected based on the "Histogram (Density 2)" illustrated in FIG. 16D. For example, when the maximum value 2 of the histogram illustrated in FIG. 16D is smaller than 200.0 mm, the adjustment chart 70A-1 is determined based on the determination table illustrated in FIG. 14.

In step S1510, the adjustment chart 1 is compared with the adjustment chart 2, and the adjustment chart having the larger amount of toner consumption is selected as an adjustment chart suitable for the print image illustrated in FIG. 16A. In the example illustrated in FIG. 16A, since the adjustment chart 70A-3 is compared with the adjustment chart 70A-1, the adjustment chart 70A-3 is selected.

Similar processing is performed for the print images illustrated in FIGS. 16B and 16C. In step S1510, adjustment charts for print images illustrated in FIGS. 16B and 16C are determined.

The CPU 114 according to the modification of print position adjustment selects an adjustment chart suitable for the output image based on the toner amount on the front surface of the output image. Thus, according to the modification of print position adjustment, the efficiency of the operator's print position adjustment operation can be improved.

Although the CPU 114 according to the modification of print position adjustment selects an adjustment chart based on the maximum value of the printing distance (in the conveyance direction) of the image included in the output image, an adjustment chart may be selected based on the toner amount consumed to print the output image. Accordingly, instead of the maximum value of the printing distance in the conveyance direction, the printing area may be used for the determination table illustrated in FIG. 14. An adjustment chart may be selected based on both the maximum value of the printing distance in the conveyance direction and the printing area.

According to embodiments of the present invention, the print position deviation amounts with respect to a print sheet can be detected with a high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-017099, filed Feb. 1, 2017, which is hereby incorporated by reference herein in its entirety.

What is claimed is:

1. An image forming apparatus comprising:
an image forming unit configured to form an image on a sheet by using a developer; and
a controller configured to control the image forming unit to form a test image on the sheet, acquire information related to the test image formed on the sheet by the image forming unit, and correct, based on the information, a position of an image to be formed on the sheet by the image forming unit,
wherein the test image is used to detect positional deviation of the image to be formed on the sheet by the image forming unit,
wherein the controller performs first processing in which the image forming unit forms the test image and a first pattern image on the sheet, and second processing in which the image forming unit forms the test image and a second pattern image on the sheet,
wherein the image forming unit forms the first pattern image so that an adhesion amount of the developer becomes a first amount, and
wherein the image forming unit forms the second pattern image so that an adhesion amount of the developer becomes a second amount that is larger than the first amount.

2. The image forming apparatus according to claim 1, wherein a density of the second pattern image is higher than a density of the first pattern image.

3. The image forming apparatus according to claim 1, wherein a size of the second pattern image is larger than a size of the first pattern image.

4. The image forming apparatus according to claim 1, wherein an image signal value for forming the first pattern image is different from an image signal value for forming the second pattern image.

5. The image forming apparatus according to claim 1, wherein the controller performs third processing in which the image forming unit forms neither the first pattern image nor the second pattern image on the sheet.

6. The image forming apparatus according to claim 1, further comprising an input unit configured to input a print setting,
wherein the controller controls whether to perform the first processing, based on the print setting input by the input unit, and
wherein the controller controls whether to perform the second processing, based on the print setting input by the input unit.

7. The image forming apparatus according to claim 1, wherein the image forming unit forms the image on the sheet based on image data,
wherein the controller controls whether to perform the first processing, based on the image data, and
wherein the controller controls whether to perform the second processing, based on the image data.

8. The image forming apparatus according to claim 1, wherein the test image as a first test image and another test image as a second test image are formed, and
wherein the controller controls the image forming unit to form the first test image on a first surface of the sheet and controls the image forming unit to form the second test image on a second surface of the sheet that is different from the first surface of the sheet.

9. The image forming apparatus according to claim 8, wherein the image forming unit includes a fixing unit configured to fix the image onto the sheet, and
wherein the controller controls the image forming unit to form the first pattern image on the first surface of the sheet, controls the fixing unit to fix the first pattern image onto the first surface of the sheet, controls the image forming unit to form the second pattern image on the second surface of the sheet, and controls the fixing unit to fix the second pattern image onto the second surface of the sheet.

10. The image forming apparatus according to claim 8, wherein the first test image and the second test image are used to detect deviation between a position of an image to be formed on the first surface of the sheet by the image forming unit and a position of an image to be formed on the second surface of the sheet by the image forming unit.

11. The image forming apparatus according to claim 1,
wherein the image forming unit forms the image on the sheet based on image data, and
wherein, to correct the position of the image to be formed on the sheet by the image forming unit, the controller performs image processing on the image data based on the information.

12. The image forming apparatus according to claim 1,
wherein the image forming unit forms the image on the sheet based on image data, and
wherein, to correct the position of the image to be formed on the sheet by the image forming unit, the controller performs an affine transformation on the image data based on the information.

13. The image forming apparatus according to claim 1, wherein, to correct the position of the image to be formed on the sheet by the image forming unit, the controller adjusts an image forming condition of the image forming unit based on the information.

14. The image forming apparatus according to claim 1, further comprising a reading unit configured to read the test image formed on the sheet by the image forming unit,
wherein the information corresponds to read data output from the reading unit.

15. A method for controlling an image forming apparatus for forming an image on a sheet by using a developer, the method comprising:
forming a test image on the sheet;
acquiring information related to the test image formed on the sheet; and
correcting, based on the information, a position of an image to be formed on the sheet,
wherein the test image is used to detect positional deviation of the image to be formed on the sheet,
wherein, in a case where the test image and a first pattern image are formed on the sheet in the test image forming, the first pattern image is formed so that an adhesion amount of the developer becomes a first amount, and
wherein, in a case where the test image and a second pattern image are formed on the sheet in the test image forming, the second pattern image is formed so that an adhesion amount of the developer becomes a second amount that is larger than the first amount.

16. The method according to claim 15, wherein a density of the second pattern image is higher than a density of the first pattern image.

17. The method according to claim 15, wherein a size of the second pattern image is larger than a size of the first pattern image.

18. The method according to claim 15, wherein an image signal value for forming the first pattern image is different from an image signal value for forming the second pattern image.

19. The method according to claim 15, wherein, in the correcting, to correct, based on image data, the position of the image to be formed on the sheet, image processing is performed on the image data based on the information.

20. The method according to claim 15, wherein, in the correcting, to correct the position of the image to be formed on the sheet, an image forming condition of the image forming apparatus is adjusted based on the information.

* * * * *